May 7, 1957   A. H. B. WALKER ET AL   2,791,731
METAL RECTIFIER ASSEMBLIES
Filed March 15, 1954

INVENTORS
ALEC HERVEY BENNETT WALKER,
DEREK ERNEST BURCH,
BY
Robert B Pierson
ATTORNEY

United States Patent Office 2,791,731
Patented May 7, 1957

2,791,731
METAL RECTIFIER ASSEMBLIES

Alec H. B. Walker and Derek E. Burch, King's Cross, London, England, assignors to Westinghouse Brake and Signal Company Limited, London, England Application March 15, 1954, Serial No. 416,321

Claims priority, application Great Britain March 31, 1953

5 Claims. (Cl. 317—234)

This invention relates to assemblies of metal rectifiers of the kind in which stacks of rectifier elements are housed in holes or recesses in a block of insulating material, and has for an object to provide assemblies of this kind in which the necessary electrical interconnections between the several stacks so housed are made in a simple manner such that the risk of making wrong connections is minimised.

A rectifier assembly according to the invention comprises a block of insulating material having a plurality of holes extending therethrough between two substantially parallel surfaces; a plurality of stacks of rectifier elements housed one in each of said holes; a sheet of insulating material having metallic connections formed on one surface thereof applied to each of said surfaces of the block respectively so that the metallic connections make contact with the stacks and form the required circuit connections therebetween and a sheet metal casing clamped around said block.

The two sheets may be composed of a single piece of insulating material folded round the block and interconnections may be made between the two sets of metallic connections by means of similar metallic connections extending between the two across the fold.

The rectifier stacks may be held in contact with the metallic circuits by means of springs housed in the holes.

The invention is illustrated by way of example in the accompanying drawings, of which Figure 1 is a side elevation, partly in cross section, of one form of rectifier assembly embodying the invention;

Figure 1:
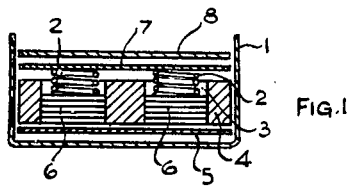
Figure 2:
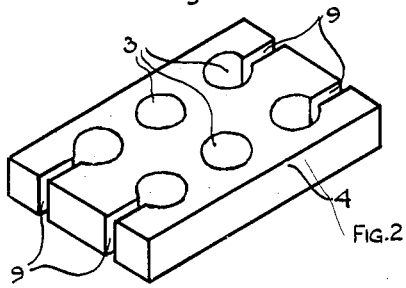
Figure 2 is a perspective view of the block of insulating material of the assembly as shown in Figure 1.

Referring now to the drawings; Figure 1 illustrates a rectifier assembly embodying the invention with the several parts shown separated from each other for the sake of clarity. The assembly comprises an open ended sheet metal case of rectangular shape having a body portion 1 and a lid 8. Placed at the bottom of the body 1 is a sheet 5 of insulating material 3 having a good thermal conductivity on top of which is the block of insulating material 4 which may be of any suitable material, such as for example that supplied under the registered trademark "Perspex." The block 4 has formed therein a plurality of holes 3, six in the example illustrated, extending therethrough, the holes 3 adjacent the two ends of the block communicating with slots 9 (Fig. 3) for the purpose of bringing out connecting tags 11 (Fig. 4) for making connections to outside circuits. Housed in the holes 3 are stacks of metal rectifier elements 6 which may, for example, be of the selenium or of the copper-oxide types. Over the top surface of the block 4 is placed a sheet 7 of insulating material similar to the bottom sheet 5, a spring 2 being placed between each of the stacks of rectifier elements 6 and the top sheet 7. The assembly is completed by the lid 8, over which the edges of the body portion 1 of the case may be turned to clamp the several parts together.

Figure 3:
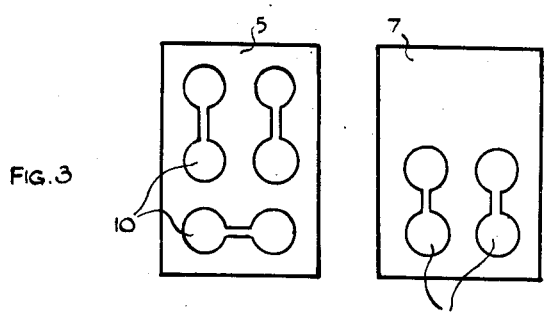
Figure 3 is a view of the top and bottom sheets of insulating material of Figure 1, showing the metallic connections formed thereon.

In order to make the necessary interconnections between the several stacks of rectifier elements 6, these connections are formed, before assembly, on the inner surfaces of the insulating sheets 5 and 7, as illustrated in Figure 3, by spraying or otherwise forming on the insulating sheets flat metallic strips 10 so positioned that, when the sheets are in position and the assembly is clamped together the springs 2 make electrical connection between the individual strips of rectifier elements and the metallic strips, the latter providing the required interconnections between the several stacks. External connections are made to connector tags 11 (Figure 4) inserted in the appropriate stacks with the "spade" portion inserted between the rectifier elements 6 and the springs 2 and the "tail" portion projecting through the slot 9 in the block 4.

Figures 4, 5:
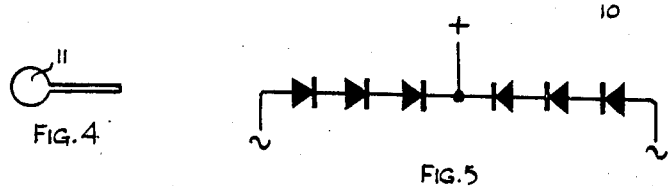
Figure 4 illustrates one suitable form of connector tag for making connections to outside circuits.
Figure 5 is a diagram representing the assembly of Figures 1, 2 and 5 in circuit form.

The interconnections illustrated in Figure 3, for example, will provide a rectifier assembly connected as indicated in Figure 5, each rectifier symbol in this figure representing a single stack of rectifier elements 6. With this arrangement the two external alternating current connections would be made to connector tags inserted at the top of the two stacks over which the metallic connections 10 on the top insulating sheet 7 do not extend, whilst the positive direct current connections would be made to the bottom of one or other of the two stacks at the other end of the block 4.

Figure 6:
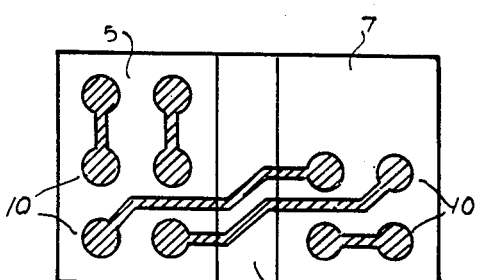
Figure 6 shows an alternative arrangement of the metallic connections.
Figure 7:
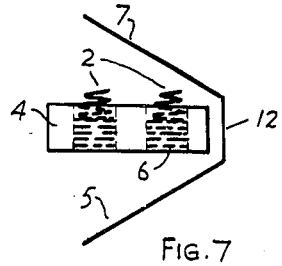
Figure 7 illustrates diagrammatically how a contact arrangement such as that shown in Figure 6 may be applied to the insulating block housing the rectifier elements.

In some cases it may be necessary or desirable to provide interconnections between the top of one stack and the bottom of another. This may be accomplished by making the two sheets 5 and 7 of insulating material in one piece with a fold 12 (Fig. 6) between them, so that the resulting single sheet can be folded round the block 4 as illustrated in Figure 7, the required interconnections between the top of one stack and the bottom of the other being carried over the fold 12, as illustrated in Figure 6.

It will thus be seen that the invention provides a quick and easy means of producing rectifier assemblies of the kind described which does away with the necessity of inserting individual metal connectors between stacks and accordingly greatly minimises the risk of making wrong connections during assembly.

Having thus described our invention what we claim is:

1. A rectifier assembly comprising, in combination, a block of insulating material having a pair of oppositely disposed substantially parallel faces with a plurality of through-extending holes therebetween; a plurality of stacks of metal rectifier elements housed one in each of said holes; a sheet of insulating material folded round said block and having metallic connections formed on its inner surface, said metallic connections making electrical contact with said stacks and providing the required circuit connections therebetween; and a sheet metal casing clamped around said block.

2. A rectifier assembly comprising, in combination, a block of insulating material having a pair of oppositely disposed substantially parallel faces with a plurality of through-extending holes therebetween; certain of which holes having a radial slot piercing the wall thereof; a plurality of stacks of metal rectifier elements housed one in each of said holes, the stacks in said certain holes incorporating connecting tags extending through said slots; a sheet of insulating material folded round said block and having metallic connections formed on its inner surface, said metallic connections making electrical contact with said stacks and providing the required circuit connections therebetween; and a sheet metal casing clamped around said block.

3. A rectifier assembly comprising, in combination, a block of insulating material having a pair of oppositely disposed substantially parallel faces with a plurality of through-extending holes therebetween; a plurality of stacks of metal rectifier elements housed one in each of said holes; a single sheet of insulating material folded round said block and having a first portion extending over one of said faces and a second portion extending over the other of said faces, said first portion and said second portion having a fold between them; metallic connections formed on the inner surfaces of said sheet and extending between said first portion and said second portion across said fold, providing the required circuit connections between said stacks; and a sheet metal casing clamped around said block.

4. A rectifier assembly comprising, in combination, a block of insulating material having a pair of oppositely disposed substantially parallel faces with a plurality of through-extending holes therebetween; a plurality of stacks of metal rectifier elements housed one in each of said holes; a sheet of insulating material having metallic connections formed on one surface thereof prior to assembly applied to each of said surfaces of said block respectively, so that said metallic connections make electrical contact with said stacks and provide the required circuit connections therebetween; and a sheet metal casing clamped around said block.

5. A rectifier assembly comprising, in combination, a block of insulating material having a pair of oppositely disposed substantially parallel faces with a plurality of through-extending holes therebetween; a plurality of stacks of metal rectifier elements housed one in each of said holes; a sheet of insulating material having a portion of one surface thereof forming metallic connections applied to each of said surfaces of said block respectively, so that said metallic connections make electrical contact with said stacks and provide the required circuit connections therebetween; and a sheet metal casing clamped around said block.

References Cited in the file of this patent

UNITED STATES PATENTS

| | | |
|---|---|---|
| 1,833,332 | Peter | Nov. 24, 1931 |
| 1,900,732 | Place | Mar. 7, 1933 |

FOREIGN PATENTS

| | | |
|---|---|---|
| 694,755 | Great Britain | July 29, 1953 |